July 18, 1967 G. M. PAVEY, JR 3,332,057
SINGLE CARDIOID WAVE DETECTOR FOR SEISMIC SIGNALS
Filed Jan. 28, 1965
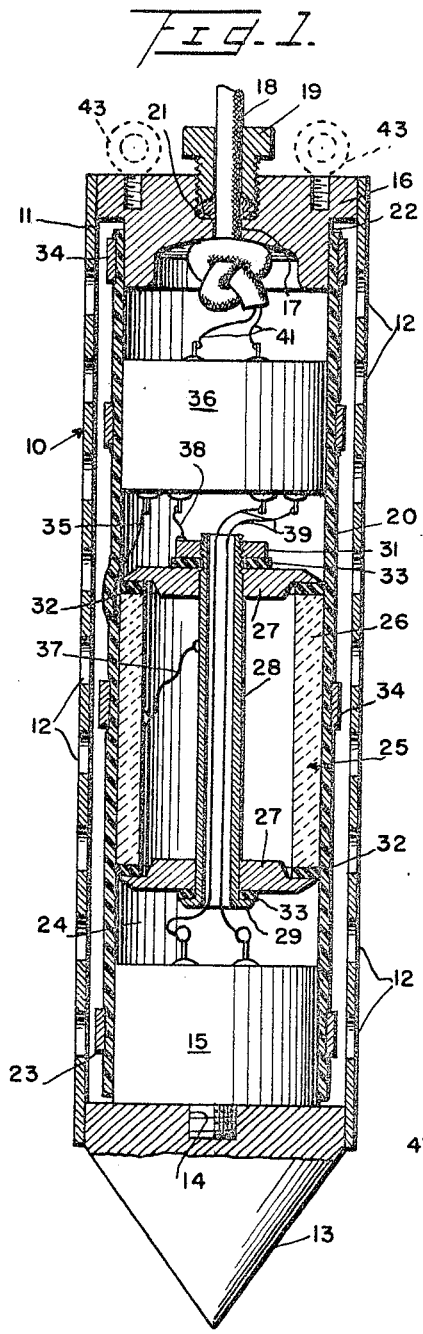
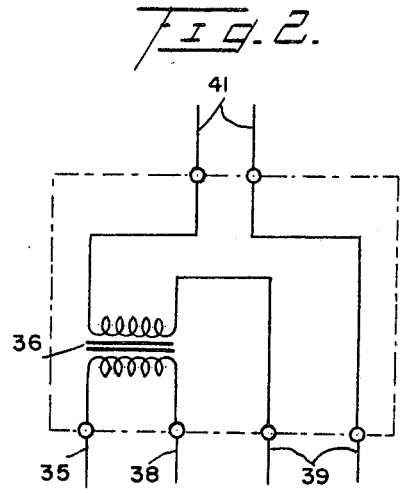
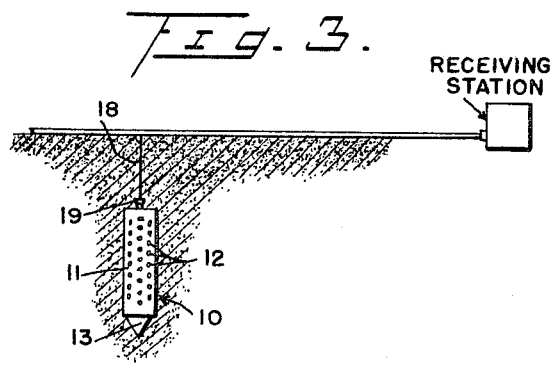
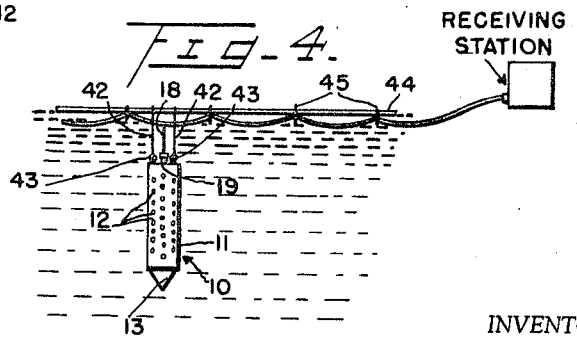
INVENTOR
G. M. PAVEY, JR.
BY
R. M. Hicke
ATTORNEY

United States Patent Office 3,332,057
Patented July 18, 1967

3,332,057
SINGLE CARDIOID WAVE DETECTOR FOR SEISMIC SIGNALS
George M. Pavey, Jr., Dallas, Tex., assignor to Sonic Engineering Company, Dallas, Tex.
Filed Jan. 28, 1965, Ser. No. 428,643
4 Claims. (Cl. 340—17)

ABSTRACT OF THE DISCLOSURE

A composite wave detector for seismic signals jetted into the bottom of a marsh or suspended vertically at a fixed depth within the water from a surface floating cable, the device comprising a perforated cylindrical casing having pressure and particle velocity acoustic signal detecting devices mounted therein and a transformer so connected to the particle velocity and pressure detecting devices as to render the voltages generated thereby additive when the seismic wave sensed thereby is moving upwardly and the voltage are in opposition and of equal magnitude when the direction of the seismic wave is reversed thereby to provide a cardioid directional seismic signal.

---

This invention relates to a phone or wave detector for seismic signals and more particularly to a detector responsive to both pressure and velocity of a seismic wave particularly suited for use in water or within the mud bottom of a swamp, marsh or the like, in which the outputs of the pressure and velocity sensing elements are combined to provide an output signal having a cardioid directional pattern.

It has been the usual practice in systems of this general character heretofore devised such, for example, as the system for Method and Underwater Detector Streamer Apparatus for Improving the Fidelity of Recorded Seismic Signals, disclosed and claimed in application, Ser. No. 344,670 filed Feb. 13, 1964, by George M. Pavey, Jr., et. al, now Patent 3,290,645, issued December 6, 1966 to provide a plurality of pressure sensing and particle velocity sensing devices disposed at intervals within an elongated flexible detector streamer towed in a submerged state within the water by a vessel. While such systems are generally well suited for use in the manner intended, they are obviously not adapted or intended for use within the mud bottom of a marsh or swamp or in areas in which the depth of the water is insufficient for the proper operation of the vessel.

The composite wave detector of the present invention is well suited to be jetted into the mud bottom of a marsh or swamp or, if desired, it may be used in either shallow or deep water by suspending it from a floating cable to which the output cable from the device is connected at intervals. The manner in which the pressure sensing and the particle velocity responsive elements are constructed and arranged within a single tubular casing suitable for jetting into the soft bottom of a marsh or swamp or, if desired, suspended in a submerged condition within the water from a floating cable or the like and combined to produce an output electrical signal having a cardioid directional pattern will be more clearly apparent as the description proceeds.

One of the objects of the present invention is to provide a new and improved sensor for generating an output signal having a cardioid directional pattern in response to the pressure and particle velocity characteristics of a seismic wave sensed thereby.

Another of the objects is a composite detecting device for effecting a cardioid directional signal in response to a seismic wave sensed thereby while the device is planted within the mud bottom of a marsh or swamp.

Still another object is to provide a new and improved phone unit for generating an electrical signal having a cardioid directional pattern in response to an acoustic signal reflected from a geological formation disposed beneath the unit.

A still further object is to provide a new and improved composite phone unit adapted for use within the mud bottom of a swamp or within a body of water, as the case may be.

Still other objects, advantages and improvements will be apparent from the following description, taken in connection with the accompanying drawings, of which:

FIG. 1 is an elevational view partially in section of a composite detector phone element suitable for use with the present invention;

FIG. 2 is a schematic view of the wiring connections within the transformer housing of FIG. 1;

FIG. 3 is a view somewhat diagrammatic of the device of FIG. 1 planted within the mud bottom of a marsh or swamp; and FIG. 4 is a schematic view somewhat diagrammatic of the device suspended by a floating cable within a body of water.

Referring now to the drawing for a more complete understanding of the invention and more particularly to FIG. 1 thereof, there is shown thereon a composite sensor or phone element designated generally by the numeral 10 comprising, among other elements an elongated metallic tubular shield or casing 11 having a plurality of perforations 12 for establishing communication between the interior of the shield and the ambient medium, either water or mud, as the case may be.

The lower end of the shield, as viewed in the figure is closed and fitted with a conical or bullet-shaped nose piece 13 secured thereto in any suitable manner and preferably provided with a centrally disposed tapped hole 14 to receive and retain a velocity responsive cylindrical geophone 15 having a moving coil (not shown) of any type suitable for the purpose such, for example, as a geophone known in the trade as a Hall Sears HS–1 geophone or a particle velocity detector of the type disclosed and claimed in application Ser. No. 344,670 of George M. Pavey, Jr., et al. supra, now patent 3,290,645.

The opposite end portion of the shield 11 is secured in any suitable manner to a plug or cover member 16 having a bore 17 therein of sufficient size to receive an electrical cable 18 preferably knotted as shown to prevent withdrawal of the cable from the cover in response to a pull applied thereto. A packing gland 19 is threaded within the cover 16 in a manner to compress a packing 21 sufficiently to secure the cable to the cover and form a watertight connection therebetween as the packing gland 19 is tightened.

The cover 16 is provided with a downwardly extending cylindrical portion 22 adapted to receive an end portion of a flexible plastic hose or tube 20 and be tightly clamped thereto substantially as shown. The lower $k$ end portion of the hose is clamped as at 23 to the housing of geophone 15. This arrangement provides a sealed chamber 24 adapted to receive and retain a copious quantity of oil placed therein.

A pressure responsive device designated generally by the numeral 25 comprising a ceramic cylinder 26 composed of piezoelectric material such, for example, as barium titanate or the like and having a pair of annular end plates 27 clamped to the opposite ends thereof by a metallic hollow threaded tubular member or bolt 28 having a head portion 29 at the lower end thereof passing through the central apertures within the end plate. A nut 31 threaded on the upper end portion of the bolt is employed to tighten the end plates against the ends of the ceramic cylinder 26.

A pair of electrically insulating gaskets 32 are provided between the end plates and the ceramic cylinder which together with a second pair of like gaskets 33 seal a quantity of air and prevent the entrance of oil within the ceramic cylinder. The pressure responsive device 25 is supported by the flexible hose 20 by any suitable means such, for example, as the clamping band 34 illustrated. The outer cylindrical surface of the ceramic cylindrical element 26 is connected as by conductor 35 to one end of the primary winding of transformer 36 which, like the pressure responsive element 26 is cylindrical in configuration and securely clamped within the hose 20 by a second clamping band 34.

The inner cylindrical surface of the ceramic pressure responsive element 26 is connected as by flexible conductor 37 to the tubular member 28 to which it is secured from whence the circuit is continued as by conductor 38 to the other end of the primary winding of transformer 36.

A pair of conductors 39 passing through the aperture in tubular member 28 establishes an electrical connection between the particle velocity responsive geophone 15 and the transformer 36 substantially as shown from whence the circuit is continued by way of the secondary winding of the transformer, FIG. 2, to a pair of conductors 41 within cable 18.

It will be noted that the connections to the transformer are such that the voltages generated by the velocity and pressure sensing devices are additive when the seismic acoustic wave sensed thereby is moving upwardly and are in opposition when the direction of movement of the seismic wave is reversed. A piezoelectric ceramic tube four and one half inches long, with an outside diameter of one and one half inches and a wall of one-eighth inch in thickness has been found suitable for the purpose although ceramic tubes of different sizes and dimensions may be employed, it being merely necessary that the voltage generated thereby in response to a downwardly moving seismic wave when connected to transformer 36 should cancel from the output signal on conductors 41 the corresponding voltage generated by the particle velocity responsive sensing element 15. It should also be noted that the signal balance required for effecting this desirable result of providing a cardioid directional signal may be achieved, if desired, by selecting the proper ratio of turns between the primary and secondary winding of the transformer.

Referring now to FIG. 3 the composite phone unit 10 is shown planted as by a jetting operation within the soft bottom of a marsh or swamp at a depth sufficient to establish good firm contact with the earth therebeneath and connected by cable 18 to a receiving station such, for example, as a flat bottomed boat at which the signals received from the composite phone unit are amplified and recorded on a moving tape or chart type of recorder.

On FIG. 4 the composite phone or seismic signal detecting device 10 is suspended in any suitable manner as by a bridle arrangement generally indicated by the numeral 42 connected to eyelets 43 secured to cover 16 of the device and to a floating cable 44 in such manner that the detecting device is submerged at a predetermined depth within a body of water. Cable 18 extends to a receiving station shown diagrammatically on the figure, which may be of any type suitable for the purpose such, for example, as a barge or other vessel provided with suitable signal amplifying and recording apparatus for producing a seismic record or chart having the characteristic of a cardioid direction pattern in response to signals received from the detecting device over the cable. If desired the cable 18 may be secured at intervals as at 45 to the floating cable or may be disposed within the floating cable, as desired, the cable 18 having an end portion protruding laterally therefrom for connection to the detecting device.

Briefly stated in summary, the present invention provides a unitary composite wave detector having both pressure and velocity responsive components disposed therein which is well suited for jetting into the mud bottom of a marsh or swamp in a substantially vertical position, or if desired, may be suspended in a vertical position at a predetermined depth within a body of water from a floating body such as a floating cable and in which the pressure and particle velocity sensing devices are electrically connected in a manner to produce a seismic signal having a cardioid directional pattern.

Although for the purpose of description, a single detection device has been described as connected to the cable 18, in practice it has been found desirable to provide a cable with twenty-four twisted signal pairs, for example, connected respectively to twenty-four seismic amplifier channels at the receiving station. Each of these pairs of conductors has connected thereto one to four detection devices, although, if desired, a greater number of detecting devices may be employed.

From the foregoing it should be clearly apparent that a typical cable may have a sufficient number of conductor pairs to establish an electrical connection from the detecting devices to the signal amplifying and recording devices at the receiving station.

Furthermore, it will be understood that the detecting devices may be planted within the bottom by means other than a jetting operation such, for example, as by a long pole detachably secured to the device by means of which the device is forced into the bottom in an upright position by an operator on the barge or flat bottom boat, after which the pole is detached from the detecting device. To insure a final vertical position of each of the detecting devices, a gimbal support therefor may, if desired, be provided. It will also be understood that the device may be suspended within the water by the cable 18 in lieu of the bridle 42 in which case the eye bolts 43 would not be required. The explosive shot employed for initiating the seismic signal to be recorded is preferably fired from a position within the earth well below the detecting devices.

While the invention has been described with particular reference to a particular example thereof which gives satisfactory results, it will be understood by those skilled in the art, after understanding the invention, that various changes and modifications may be made without departing from the spirit and scope of the invention and it is my intention, therefore, in the appended claims to cover all such changes and modifications.

What I claim as new and desire to be secured by Letters Patent of the United States is:

1. A detecting device for a seismic wave comprising
    (1) a rigid elongated perforated cylindrical casing suitable for planting in a substantially vertical position within the bed of a swamp,
    (2) a particle velocity sensing device of outer cylindrical configuration secured within said casing,
    (3) a pressure sensing device yieldably clamped within the casing above said particle velocity sensing device,
    (4) means including a transformer of outer cylindrical configuration interconnecting said particle velocity and pressure sensing devices in a manner to effect a cardioid directional signal in response to a seismic wave sensed by said particle velocity and pressure sensing devices,
    (5) a circular cover secured to one end of said casing and having a cylindrical portion formed integral therewith of less diameter than the interior of the casing and extending interiorly into the casing coaxially therewith,
    (6) means including a pair of diametrically disposed eye bolts secured to said cover and extending outwardly therefrom for suspending the wave detecting device in a substantially vertical position within a body of water, (7) a rigid conical nose piece secured to the other end of said casing,
(8) means for securing said particle velocity sensing device to said nose piece within said casing and in coaxial spaced relation therewith,
(9) a flexible tube within said casing and clamped at the end portions thereof to said cylindrical portion of said cover and to said particle velocity sensing device respectively to form an oil filled chamber therebetween, and
(10) means for clamping said pressure sensing device at a mid portion thereof to the interior of said flexible tube thereby to yieldably support the pressure sensing device within the casing.

2. A detecting device for a seismic wave according to claim 1 in which means are provided for supporting said transformer within and by said flexible tube in a position intermediate said pressure sensing device and said cover.

3. A seismic system for receiving a seismic signal having a cardioid directional pattern at a receiving station comprising a detecting device according to claim 1 comprising, in combination,
(1) a surface floating cable from which the detecting device is suspended at a predetermined depth of submersion within the water, and
(2) an output cable connected to said detecting device and secured at intervals along said surface floating cable for establishing an electrical channel of communication between the detecting device and the receiving station.

4. A composite detecting device for effecting a cardioid directional signal in response to a seismic wave sensed thereby, comprising,
(1) a hollow cylindrical metallic perforated casing having a nose piece of outer conical configuration securely fitted to and enclosing an end portion thereof thereby to render the device suitable for jetting into the mud bottom of a marsh,
(2) a velocity responsive moving coil geophone of generally cylindrical configuration and less diameter than the inside diameter of said casing secured to said nose piece coaxially therewith,
(3) a plug-like cover having a central bore therein and an inwardly extending cylindrical portion of substantially the same diameter as said geophone secured to the other end portion of said casing,
(4) an electric cable extending through said bore for establishing an external electrical connection to the device,
(5) a packing gland on said cover for effecting a watertight connection with said cable,
(6) a length of flexible plastic tube encircling both said geophone and said cylindrical portion of the cover and securely clamped thereto to form an oil filled sealed chamber,
(7) a pressure sensing device comprising an elongated hollow cylindrical piezoelectric element fitted within said flexible tube and clamped thereto at the midportion of the piezoelectric element, the ends of said piezoelectric element being sealed to form an air chamber therebetween,
(8) a transformer having a cylindrical casing clamped within said flexible tube intermediate said pressure sensing device and said cover and having an output circuit connected to said electrical cable, said output circuit including the coil of said geophone,
(9) means for connecting the inner and outer cylindrical surfaces of said piezoelectric element to the input of said transformer in a manner to effect a cardioid directional signal correlative with a seismic wave sensed by the device,
(10) and means including at least one eye member secured to said cover for suspending said device from a floating cable at a predetermined depth within a body of water while the cable floats on the surface thereof.

References Cited
UNITED STATES PATENTS

| | | | |
|---|---|---|---|
| 2,681,442 | 5/1954 | Schurman | 340—7 X |
| 2,729,300 | 1/1956 | Paslay et al. | 181—.5 |
| 2,740,945 | 3/1956 | Howes | 340—15 |
| 2,783,449 | 2/1957 | Loofbourrow | 340—17 |
| 2,846,662 | 8/1958 | Sparks | 340—17 |
| 3,009,131 | 11/1961 | Woodworth | 340—17 |

BENJAMIN A. BORCHELT, *Primary Examiner.*

SAMUEL FEINBERG, *Examiner.*

P. A. SHANLEY, *Assistant Examiner.*